US008964206B2

(12) United States Patent
Doui

(10) Patent No.: US 8,964,206 B2
(45) Date of Patent: Feb. 24, 2015

(54) PRINTING DEVICE, MANAGEMENT DEVICE AND MANAGEMENT METHOD

(71) Applicant: Takayuki Doui, Takatsuki (JP)

(72) Inventor: Takayuki Doui, Takatsuki (JP)

(73) Assignee: Konica Minolta Business Technologies Inc., Chiyoda-Ku, Tokyo (JP)

( * ) Notice: Subject to any disclaimer, the term of this patent is extended or adjusted under 35 U.S.C. 154(b) by 58 days.

(21) Appl. No.: 13/763,055

(22) Filed: Feb. 8, 2013

(65) Prior Publication Data
US 2013/0208299 A1    Aug. 15, 2013

(30) Foreign Application Priority Data

Feb. 9, 2012    (JP) ................. 2012-025838

(51) Int. Cl.
*G06F 15/00*    (2006.01)
*G06F 3/12*    (2006.01)
*G06K 1/00*    (2006.01)
(Continued)

(52) U.S. Cl.
CPC ............ *G06K 15/02* (2013.01); *G06K 15/4095* (2013.01); *G06F 3/121* (2013.01); *G06F 3/1234* (2013.01); *G06F 3/1261* (2013.01); *G06F 3/1292* (2013.01); *G06F 3/1238* (2013.01); *G06K 15/002* (2013.01)
USPC ........................................ 358/1.14; 358/1.13

(58) Field of Classification Search
CPC .... G06K 15/02; G06K 15/4095; G06F 3/121; G06F 3/1234; G06F 3/1261; G06F 3/1292
USPC ........................................ 358/1.1, 1.15, 1.14
See application file for complete search history.

(56) References Cited

U.S. PATENT DOCUMENTS 8,090,948 B2 *    1/2012    Sugiura et al. ................. 713/175
2010/0245033 A1    9/2010    Sasakuma

FOREIGN PATENT DOCUMENTS

| JP | 2001-067197 A | 3/2001 |
|---|---|---|
| JP | 2006-088356 A | 4/2006 |
| JP | 2006-172089 A | 6/2006 |

(Continued)

OTHER PUBLICATIONS

Office Action (Notice of Grounds of Rejection) issued on Feb. 4, 2014, by the Japanese Patent Office in corresponding Japanese Application No. 2012-025838, and an English Translation of the Office Action. (7 pages).

(Continued)

*Primary Examiner* — Douglas Tran
(74) *Attorney, Agent, or Firm* — Buchanan Ingersoll & Rooney PC

(57) ABSTRACT

A printing device includes an authentication unit, a job input unit configured to receive input of a print job, a printing processing unit configured to perform printing processing for the print job, and an instruction input unit configured to receive input of an instruction on output of a printed matter of the print job. The printing processing in the printing processing unit is controlled in accordance with an instruction from a user successfully authenticated by the authentication unit. The printing device further includes a proxy registration processing unit capable of setting, for the print job, a user different from an issuer of the print job as a user who instructs output of the printed matter, and causes the printed matter to be output when the instruction on output is made by the user set as the user who instructs output of the printed matter.

13 Claims, 9 Drawing Sheets

(51) Int. Cl.
*G06K 15/02* (2006.01)
*G06K 15/00* (2006.01)

(56) References Cited

FOREIGN PATENT DOCUMENTS

| | | |
|---|---|---|
| JP | 2007-320084 A | 12/2007 |
| JP | 2008-077190 A | 4/2008 |
| JP | 2009-066929 A | 4/2009 |
| JP | 2009-230616 A | 10/2009 |
| JP | 2009-277188 A | 11/2009 |
| JP | 2010-231285 A | 10/2010 |

OTHER PUBLICATIONS

Office Action from the Japan Patent Office dated Jun. 17, 2014, issued in corresponding Japanese Patent Application No. 2012-025838, with English translation thereof. (6 pages).

* cited by examiner

PRINTING DEVICE, MANAGEMENT DEVICE AND MANAGEMENT METHOD

This application is based on Japanese Patent Application No. 2012-025838 filed with the Japan Patent Office on Feb. 9, 2012, the entire content of which is hereby incorporated by reference.

BACKGROUND OF THE INVENTION

1. Field of the Invention

The present invention relates to a printing device, a management device and a management method, and more particularly relates to a printing device, a management device and a management method, wherein a printed matter is output when user authentication has succeeded.

2. Description of the Related Art

When printing a printed matter whose estimated use time in a meeting or the like has been determined using a printing device, such as a printer or MFP (Multi-Functional Peripheral) as a composite machine including a printer function, printing may not be completed by the estimated use time because of an interruption of printing or lengthening of the time required for printing due to print job waiting or a machine trouble, such as paper shortage, jam (paper jam) or toner shortage.

On this occasion, a job issuer will perform operations such as identifying a cause, solving that cause and resuming printing. When such operations are performed, however, the job issuer may fail to meet the estimated use time in a meeting or the like, although he/she can obtain a printed matter. Otherwise, the job issuer may perform an operation of deleting a print job itself. However, if the print job is deleted, the job issuer cannot use the printed matter, although he/she is in time for the meeting or the like.

To solve such problems, Japanese Laid-Open Patent Publication No. 2009-277188 (hereinafter, Patent Literature 1), for example, discloses a technique for improving convenience in causing another user to vicariously obtain a printed matter from an outside location. In more detail, Patent Literature 1 discloses a system for sending e-mail from an outside location to a printing device that requests vicarious acquisition of a printed matter, thereby requesting a proxy previously registered to perform vicarious execution. Patent Literature 1 also discloses a system for requesting a temporary proxy, if indicated in e-mail, to perform vicarious execution.

Japanese Laid-Open Patent Publication No. 2001-67197 (hereinafter, Patent Literature 2) discloses a system for, if a printing error occurs, requesting another printer having resources necessary for printing processing to perform printing vicariously, so that output processing is continued.

Japanese Laid-Open Patent Publication No. 2006-172089 (hereinafter, Patent Literature 3) discloses a system for, if a printing error occurs, reporting an error condition to another device, so that the other device holds an error job list and printing can be continued by the other device in accordance with a user's selection.

Japanese Laid-Open Patent Publication No. 2007-320084 (hereinafter, Patent Literature 4) discloses a system for, if a printing error occurs and another device is requested to perform printing processing vicariously, searching for an optimal candidate printing device as a printing device that performs vicarious processing based on the capability of the printing device and the count of the number of times of vicarious processing having been performed.

Japanese Laid-Open Patent Publication No. 2006-88356 (hereinafter, Patent Literature 5) discloses a system for determining whether or not a printer can print a print job sent from a host device (server) and if determined that printing is impossible, transferring the job from the host device to another printer.

With the technique of above-mentioned Patent Literature 1, it is necessary to request a proxy to perform vicarious execution before the issuance of a print job. Therefore, with the technique of Patent Literature 1, it will be no longer possible to request the proxy to perform vicarious execution in the case where print job waiting or a machine trouble is found after the issuance of a print job as in the aforementioned example. Therefore, the technique of Patent Literature 1 cannot solve the aforementioned problems, such as the failure of a printed matter to meet the estimated use time or its non-availability in the case of the aforementioned example.

It is conceivable to terminate an interrupted print job, republish the print job, and request a proxy to perform vicarious execution at the time of issuance of the job. However, it will take a longer time until printing is completed because of these operations. Therefore, if an estimated use time of a printed matter has been set, printing may not be completed in time for that time.

With the techniques of above-mentioned pieces of Patent Literature 2 to 5, a print job cannot be transferred if another printing device equivalent to an original printing device is not located nearby.

SUMMARY OF THE INVENTION

The present invention was made in view of such problems, and has an object to provide a printing device, a management device and a management method, capable of requesting acquisition of a printed matter after issuance of a print job.

According to an aspect of the present invention, a printing device includes an authentication unit, a first input unit configured to receive input of a print job, a printing unit configured to perform printing processing for the print job, a second input unit configured to receive input of an instruction on output of a printed matter of the print job, and a controller configured to control the printing processing in the printing unit in accordance with an instruction from a user successfully authenticated by the authentication unit. The controller includes a setting unit configured to be capable of setting, for the print job, a user different from an issuer of the print job as a user who instructs output of the printed matter. The controller is configured to cause the printed matter to be output when the instruction on output is made by the user set as the user who instructs output of the printed matter.

Preferably, the printing device further includes a communication unit configured to communicate with another device. The setting unit is configured to set the user who instructs output of the printed matter in accordance with an operation signal input from the other device.

Preferably, the setting unit is configured to present, for the print job, candidates for the user who instructs output of the printed matter, and set a user selected from among the candidates as the user who instructs output of the printed matter.

More preferably, the setting unit is configured to be capable of communicating with a management device configured to manage user's entering/leaving a room, and present one of a user who is in a room where the printing device is installed and a user allowed to enter/leave the room, as a candidate for the user who instructs output of the printed matter.

More preferably, the setting unit is configured to store, for each issuer of a print job, a history of users set as the user who instructs output of the printed matter for a print job issued by the issuer, and present candidates for the user who instructs output of the printed matter based on the history of the issuer of the print job.

Preferably, the printing device further includes a communication unit configured to communicate with another device. The controller further includes a reporting unit configured to make a report to a destination associated with a user set as the user who instructs output of the printed matter.

More preferably, the reporting unit is configured to make a report on identification information on the print job.

More preferably, the reporting unit is configured to make a report on a status of the printing device and/or a state of progress of printing processing for the print job.

More preferably, when there is no instruction on output of the printed matter made by the user set as the user who instructs output of the printed matter within a prescribed time period, the reporting unit is configured to make a report to the destination associated with the user set as the user who instructs output of the printed matter.

Preferably, when the setting unit sets a plurality of users as the user who instructs output of the printed matter, after output of the printed matter is instructed by one user among the plurality of users and the printed matter is output, the controller is configured to cancel setting as the user who instructs output of the printed matter made on users other than the one user among the plurality of users.

According to another aspect of the present invention, a management device is a management device for managing printing processing for a print job in a printing device, including a first input unit configured to receive input of a print job, a second input unit configured to receive input of an instruction on output of a printed matter of the print job, and a processing unit configured to instruct the printing device on printing processing for the print job in accordance with an instruction from a user successfully authenticated. The processing unit includes a setting unit configured to be capable of setting a user different from an issuer of the print job, as a user who instructs output of the printed matter. The processing unit is configured to cause the printing device to output the printed matter when the instruction on output is made by the user set as the user who instructs output of the printed matter.

According to still another aspect of the present invention, a management method is a method for managing printing processing for a print job in a printing device, including inputting a print job to the printing device, setting a user different from an issuer of the print job as a user who instructs output of a printed matter of the print job before the printed matter of the print job is output from the printing device, and outputting the printed matter in the printing device when the instruction on output is received from the user set as the user who instructs output of the printed matter.

According to still another aspect of the present invention, a non-transitory computer-readable storage medium has stored therein a management program for causing a computer to execute management of printing processing for a print job in a printing device. The program causes a controller of the computer to execute inputting a print job to the printing device, setting a user different from an issuer of the print job as a user who instructs output of a printed matter of the print job before the printed matter of the print job is output from the printing device, and causing the printing device to output the printed matter when the instruction on output is received from the user set as the user who instructs output of the printed matter.

The foregoing and other objects, features, aspects and advantages of the present invention will become more apparent from the following detailed description of the present invention when taken in conjunction with the accompanying drawings.

DESCRIPTION OF THE PREFERRED EMBODIMENTS

Figure 1:
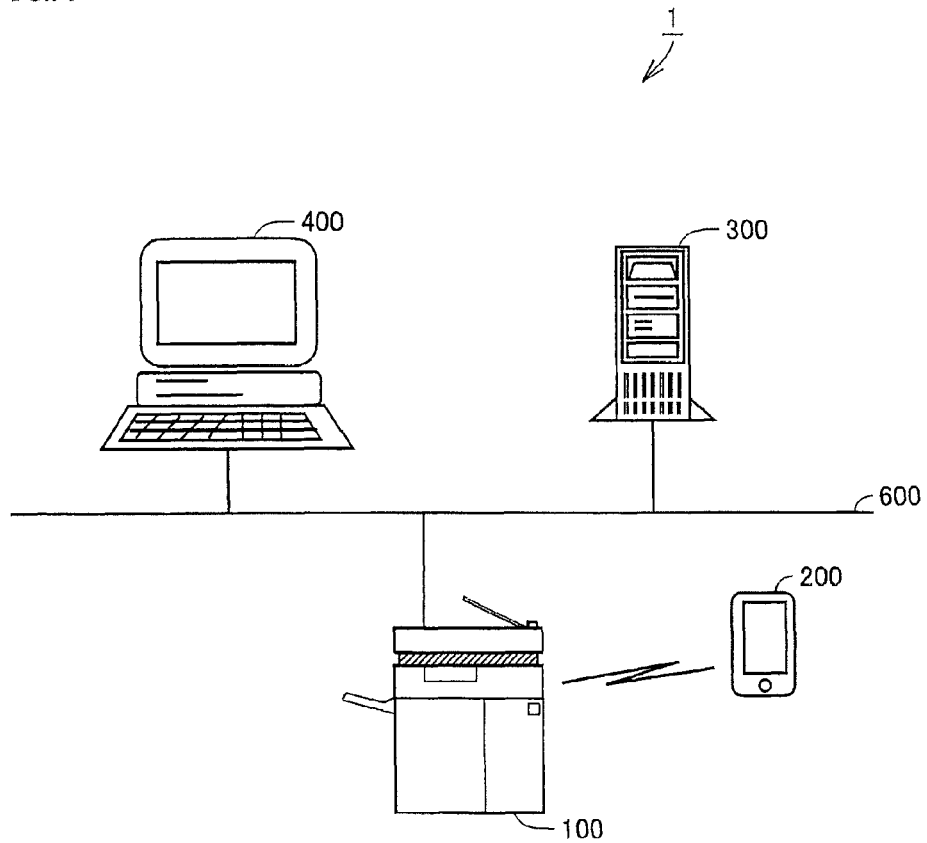
FIG. 1 shows a specific example of a configuration of a printing system according to an embodiment.

Hereinafter, an embodiment of the present invention will be described with reference to the drawings. In the following description, like parts and components are denoted by like reference characters. They are named and function identically as well. Therefore, description thereof will not be repeated.

<System Configuration>

FIG. 1 shows a specific example of a configuration of a printing system according to the present embodiment.

Referring to FIG. 1, the printing system according to the present embodiment includes an MFP 100 as an example of a printing device, a portable terminal 200 as a terminal device, a PC (Personal Computer) 400 as a device issuing a job, and a server 300 as a management device for job management.

MFP 100, server 300 and PC 400 are electrically connected through a network 600, such as LAN (Local Area Network). Network 600 may be wired or may be wireless.

Portable terminal 200 may also be electrically connected through network 600. For example, MFP 100, server 300 and PC 400 may each be electrically connected through network 600 as a wired LAN, and network 600 as a wired LAN may further include a wireless LAN access point not shown, and portable terminal 200 may be electrically connected to the wireless LAN access point through the wireless LAN.

MFP 100 and portable terminal 200 are capable of making direct communications. Examples of such communications include wireless communications through the use of Bluetooth®, infrared-ray communications and short distance wireless communications.

The printing device is not limited to MFP, but may be a copy machine, a printer, a facsimile transceiver, or the like. The portable terminal is implemented by a mobile phone, for example, or may alternatively be implemented by a PC similar to PC 400, a PDA (Personal Digital Assistant), a digital camera, a document viewing device, or the like.

<Device Configuration>

Figure 2:
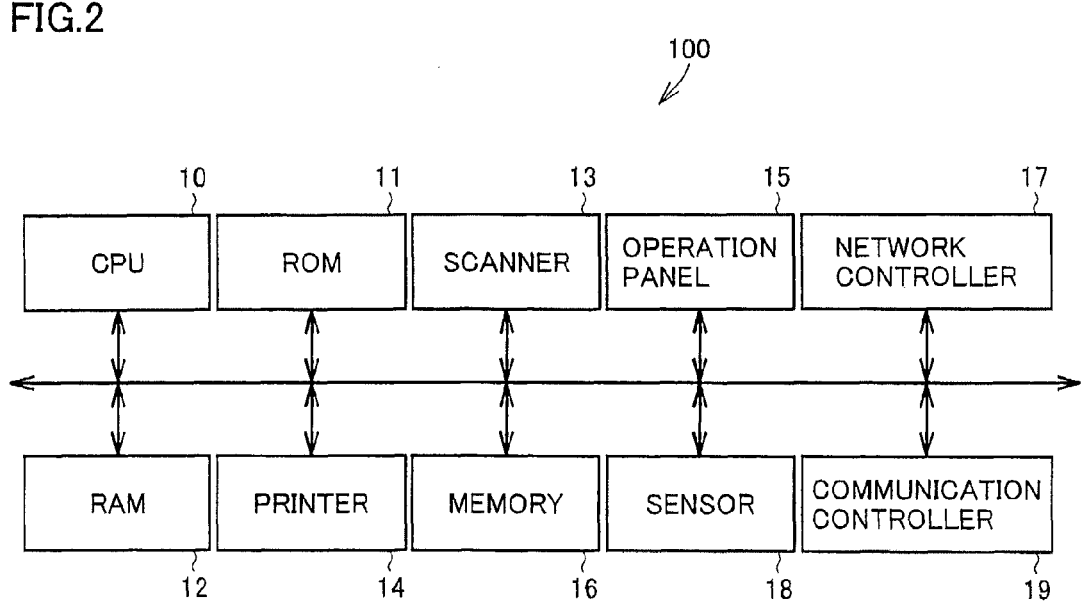
FIG. 2 shows a specific example of a hardware configuration of MFP (Multi-Functional Peripheral) included in the printing system.

FIG. 2 shows a specific example of a hardware configuration of MFP 100.

Referring to FIG. 2, MFP 100 includes a CPU (Central Processing Unit) 10 as an arithmetic device for overall control, a ROM (Read Only Memory) 11 for storing programs and the like to be executed by CPU 10, a RAM (Random Access Memory) 12 for functioning as a working area during execution of a program by CPU 10, a scanner 13 for optically reading a document placed on a document table not shown to obtain image data, a printer 14 for fixing image data on a printing paper, an operation panel 15 including a touch panel for displaying information and receiving an operation input to MFP 100 concerned, a memory 16 for storing image data and the like, a network controller 17 for controlling communications through network 600, a sensor 18 for detecting the state of MFP 100, and a communication controller 19 for controlling wireless communications with portable terminal 200.

Operation panel 15 includes the touch panel and an operation key group not shown. The touch panel is composed of a display device such as a liquid crystal display and a pointing device such as an optical touch panel or a capacitance touch panel, the display device and the pointing device overlapping each other, and displays an operation screen so that an indicated position on the operation screen is identified. CPU 10 causes the touch panel to display the operation screen based on data stored previously for causing screen display.

Sensor 18 is implemented by, for example, a sensor for detecting the remaining amount of toner, lack of toner and lack of paper, a sensor for detecting jam (paper jam) in each part, temperature anomaly, operation failure, and the like, a sensor for detecting discharge of a printed sheet onto a paper discharge tray, or the like.

Figure 3:
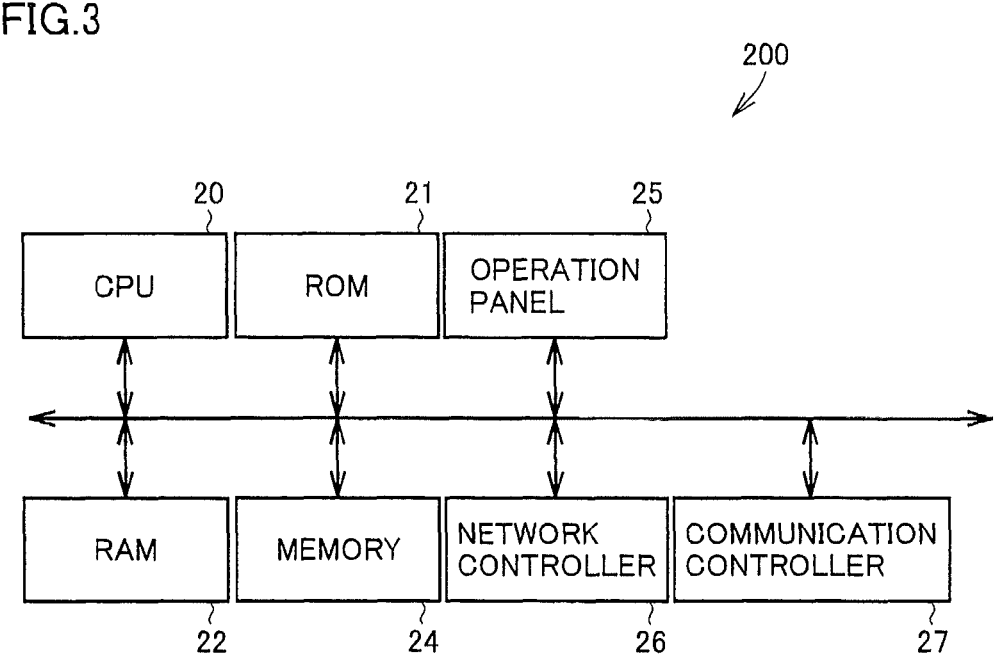
FIG. 3 shows a specific example of a hardware configuration of a portable terminal included in the printing system.

FIG. 3 shows a specific example of a hardware configuration of portable terminal 200.

Referring to FIG. 3, portable terminal 200 includes a CPU 20 as an arithmetic device for overall control, a ROM 21 for storing programs and the like to be executed by CPU 20, a RAM 22 for functioning as a working area during execution of a program by CPU 20, a memory 24 for storing telephone directory data and the like, an operation panel 25 including a touch panel for displaying information and receiving an operation input to portable terminal 200 concerned, a network controller 26 for controlling communications through network 600, and a communication controller 27 for controlling wireless communications with MFP 100.

Figure 4:
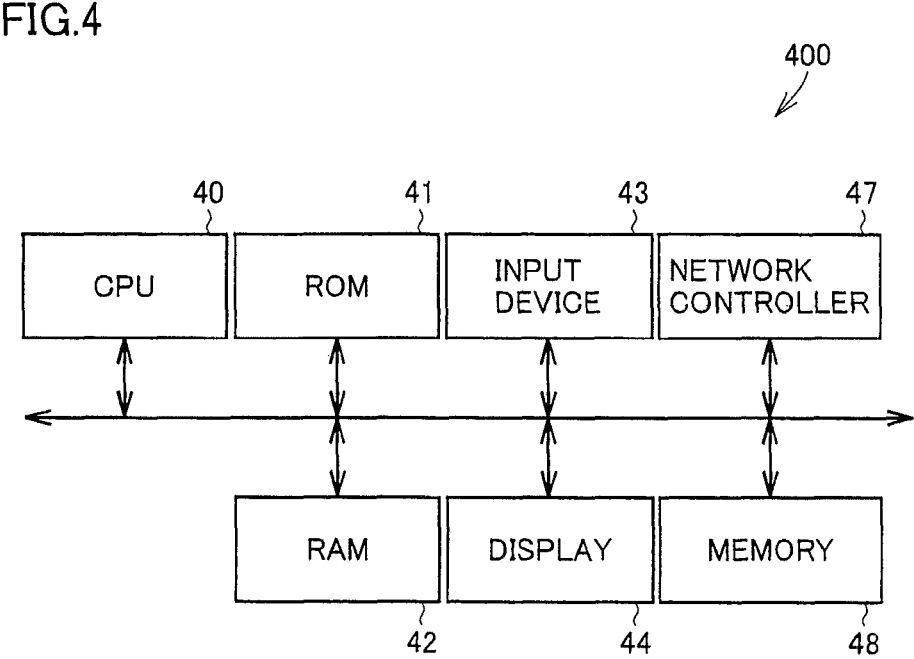
FIG. 4 shows an example of a hardware configuration of a PC (personal computer) included in the printing system.

FIG. 4 shows an example of a hardware configuration of PC 400.

Referring to FIG. 4, PC 400 includes a CPU 40 as an arithmetic device for overall control, a ROM 41 for storing programs and the like to be executed by CPU 40, a RAM 42 for functioning as a working area during execution of a program by CPU 40, an input device 43, such as a keyboard or a mouse, for receiving an operation input to PC 400, a display 44, a network controller 47 for controlling communications through LAN, and a memory 48 for storing document data and the like.

Server 300 may have a configuration similar to that of PC 400.

<Outline of Operation>

Figure 5:
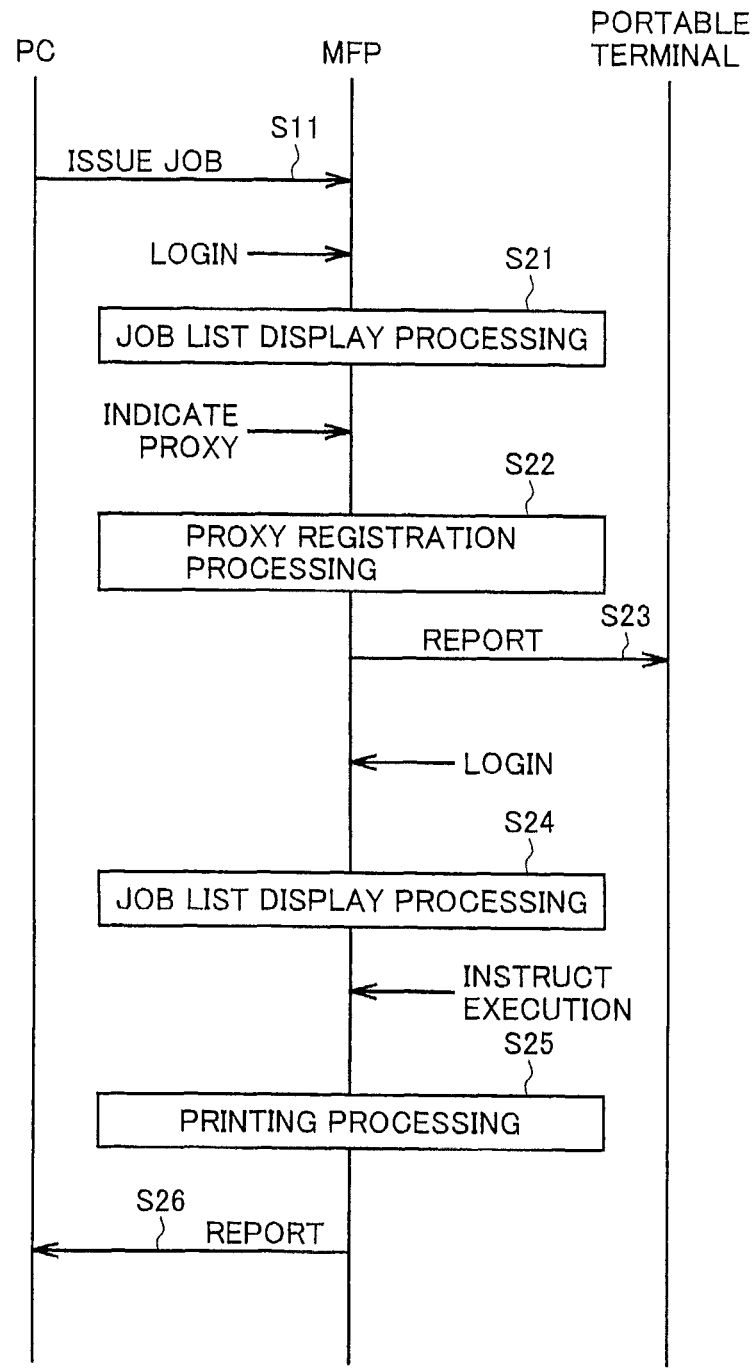
FIG. 5 shows the outline of operations in the printing system.

FIG. 5 shows the outline of operations in the printing system according to the present embodiment.

Referring to FIG. 5, upon receipt of an operation for job issuance, PC issues a print job to an indicated MFP (step S11). The print job may be issued to MFP through a server.

Upon receipt of a login operation from a job issuer, MFP performs job list display processing for displaying a list of print jobs associated with the login user (step S21).

Figure 6:
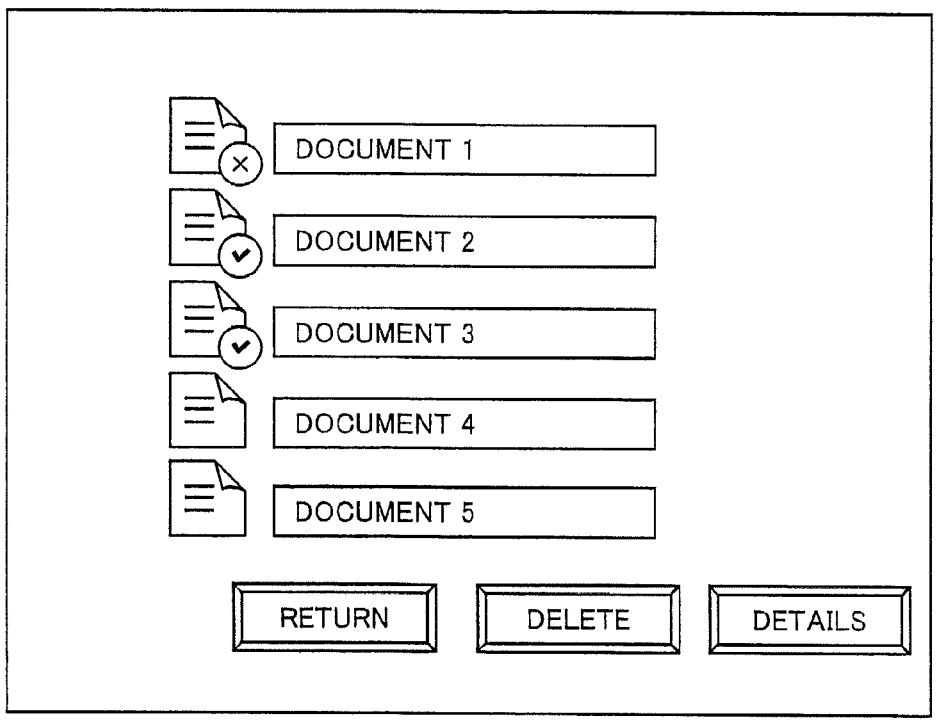
FIGS. 6 to 11 show specific examples of display screens of MFP.

FIG. 6 shows a specific example of a display screen of the job list displayed on MFP in step S21 above. In the job list of FIG. 6, print jobs associated with the login user are displayed together with distinctions between completed printing and uncompleted printing. As a print job for which printing has been completed, for example, a print job for which printing has been completed within a predetermined time period may be extracted.

Figure 7:
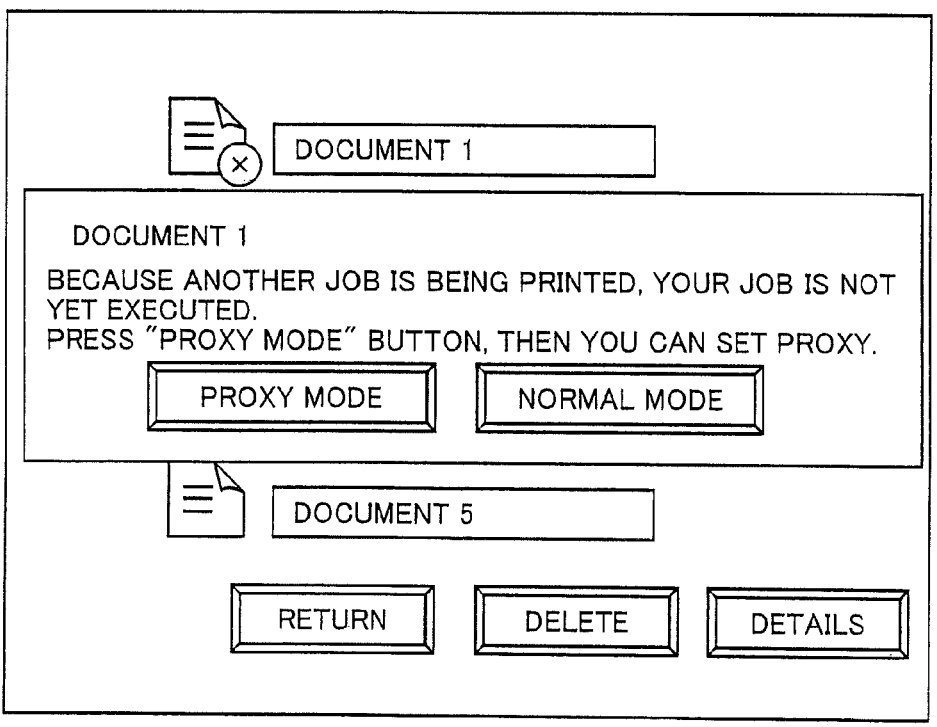

If a print job for which printing has not been completed is selected from the job list of FIG. 6, a screen in which a selection between bringing that print job into a "proxy mode" of setting a "proxy" and bringing that print job into a "normal mode" without setting a "proxy" is to be made is displayed, as shown in FIG. 7. This screen may be displayed as a popup window on the job list of FIG. 6 as shown in FIG. 7, or the screen may transition, or a button, for example, capable of selecting an uncompleted print job may be displayed in the job list of FIG. 6 in association with that uncompleted print job.

The "proxy" refers to a user who receives, from MFP, a printed matter as a result of printing processing for this print job instead of a job issuer. In general, in a mode called secure print in which a printed matter is output on condition of successful login to MFP, after the job issuer logs in to MFP, a print job issued by the login user is subjected to printing processing, and a printed matter is discharged. Therefore, the printed matter will not be seen or taken away by a third party other than the job issuer, which can ensure security. This mode will be called the "normal mode."

In contrast, in the "proxy mode", the "proxy" is set for a print job. After the "proxy" different from the job issuer logs in to MFP, a print job issued by the login user subjected to printing processing, and a printed matter is discharged.

Figure 8:
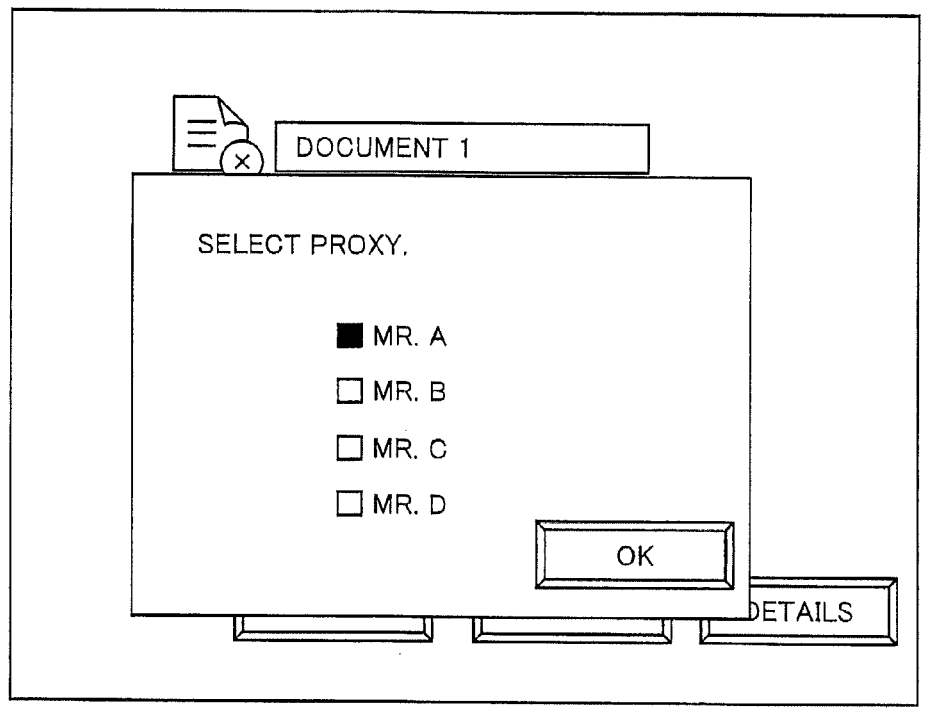

On the screen of FIG. 7, a selection between the "proxy mode" and the "normal mode" is made for a print job for which printing processing has not been completed. When the "proxy mode" is selected, MFP extracts users to be candidates for the "proxy", and displays a screen as shown in FIG. 8 in which a user to be the "proxy" is to be set. This screen may also be displayed as a popup window on the job list of FIG. 6 as shown in FIG. 8, or the screen may transition. The method for extracting users to be candidates for the "proxy" will be described later.

Figure 9:
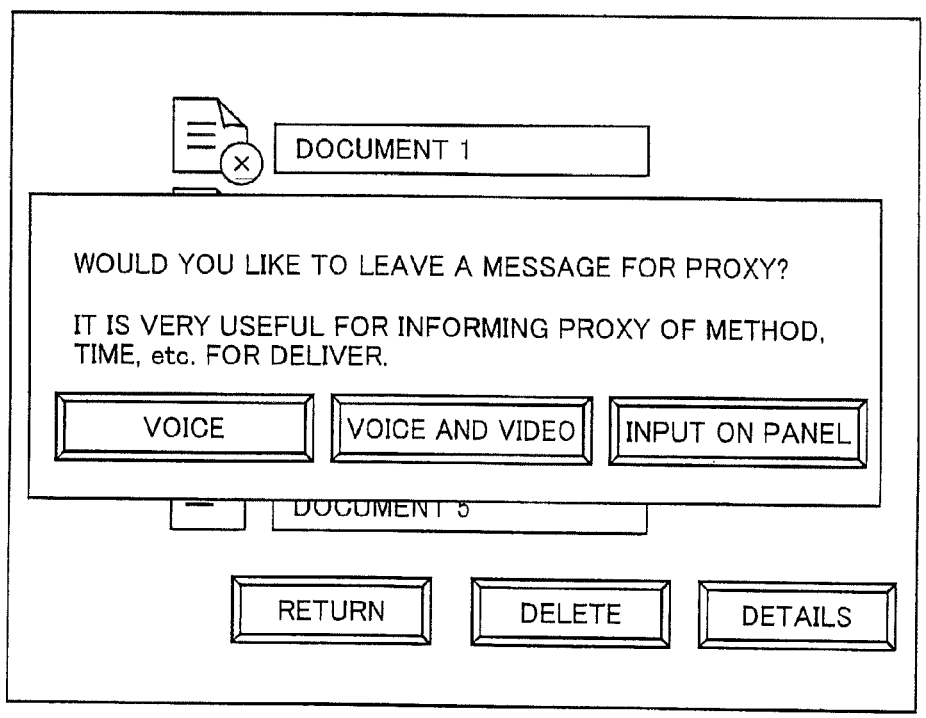

MFP may receive, from the job issuer, a message addressed to a user set as the "proxy." As an example, MFP may display a screen as shown in FIG. 9, receive a selection of any form from among a voice message, a voice and video message and a text message made by input on operation panel 15, and then receive input of data to be the message.

MFP stores, in association with the print job, information that specifies a user set as the "proxy" and information on the input message addressed to that user (step S22).

When a user to be the "proxy" is indicated on the screen of FIG. 8, MFP makes a report to a report destination previously stored in association with that user that he/she has been set as the "proxy" (step S23). For example, MFP may send e-mail based on an e-mail format previously stored to a portable terminal associated with that user.

If a message is input on the screen of FIG. 9, MFP may send the message with the report. Alternatively, MFP may reproduce the message in accordance with an operation after the user set as the "proxy" logs in to MFP, which will be described later, or may perform both transmission and reproduction.

When the user having received this report logs in to MFP, MFP performs the job list display processing for displaying a list of print jobs associated with this login user, similarly to step S21 described above (step S24). In step S24, not only the print job issued by this login user, but also the print job for which this login user has been set as the "proxy" are displayed in the job list.

Figure 10:
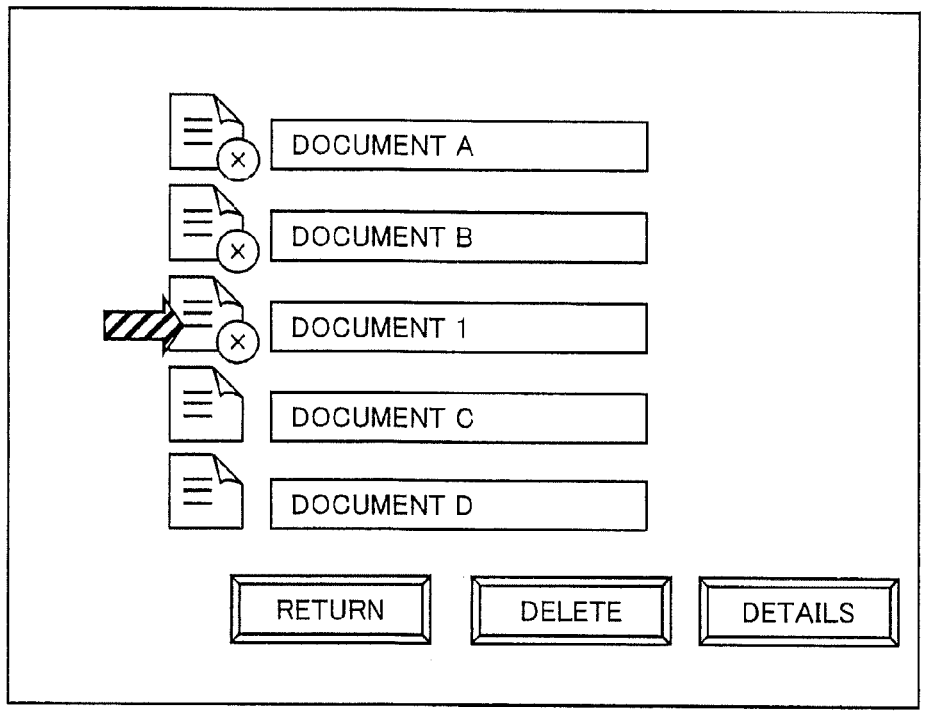

FIG. 10 shows a specific example of a display screen of the job list displayed on MFP in step S24 described above. In the job list of FIG. 10, together with print jobs issued by this login user, a print job for which this login user has been set as the "proxy" is also displayed. Furthermore, in the job list of FIG. 10, the print job for which this login user has been set as the "proxy" is displayed in a different manner from other print jobs not having been set as such.

Figure 11:
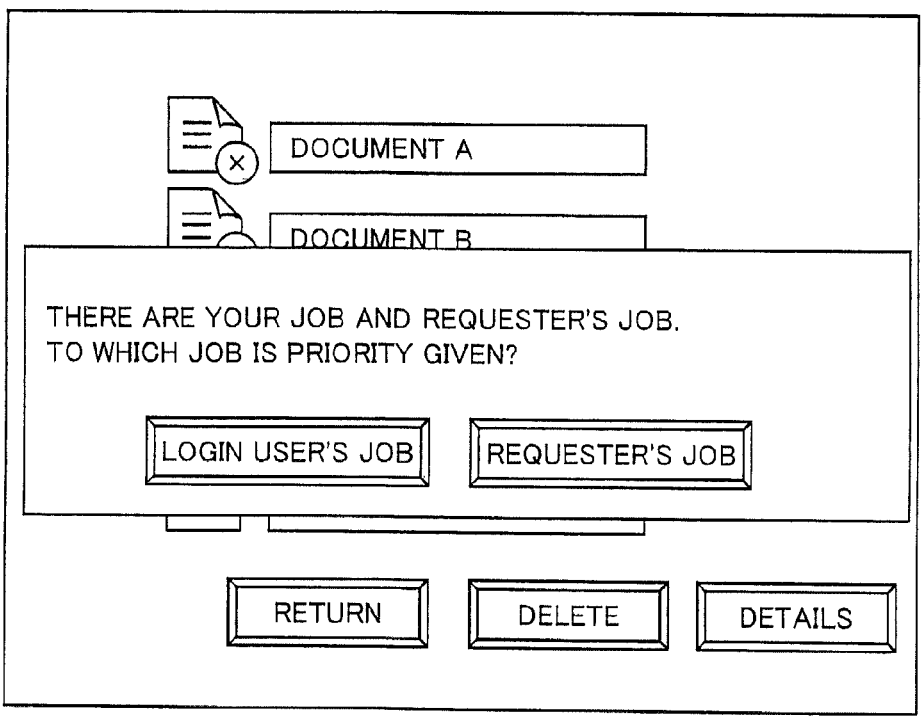

Moreover, as shown in FIG. 11, MFP may display a popup window indicating that there is a print job for which this login user has been set as the "proxy" and receive a selection between giving priority to the print job issued by the login user and giving priority to the print job for which he/she has been set as the "proxy." MFP may change the order of processing of print jobs associated with this login user in accordance with the selection here.

Upon receipt of an instruction, from this login user, to execute the print job for which he/she has been set as the "proxy", MFP executes printing processing (step S25). Then, MFP makes a report to the job issuer that printing processing for this print job has been completed (step S26).

<Functional Configuration>

Figure 12:
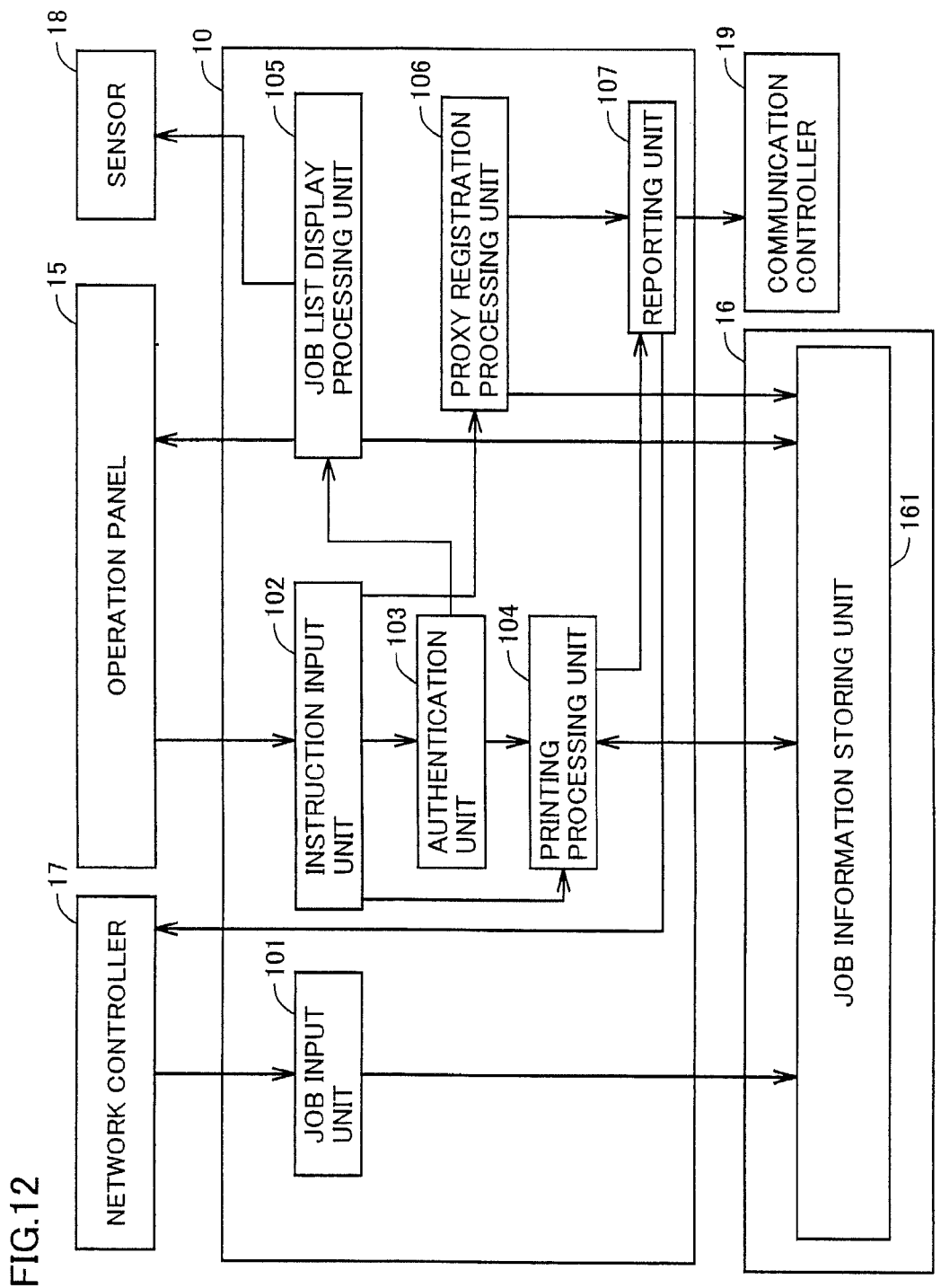
FIG. 12 is a block diagram showing a specific example of a functional configuration of MFP.

FIG. 12 is a block diagram showing a specific example of a functional configuration of MFP 100 for performing the above-described operations. Each function shown in FIG. 12 is a function mainly configured in CPU 10 by CPU 10 of MFP 100 reading a program stored in ROM 11 and executing the program on RAM 23. However, at least some functions may be configured by the hardware configuration shown in FIG. 2.

Referring to FIG. 12, memory 16 is provided with a job information storing unit 161 which is a storage area for storing a print job and information associated with that job as job information.

Further referring to FIG. 12, CPU 10 also includes a job input unit 101 for receiving input of a print job issued by PC 400 via network controller 17 and causing job information related to that print job to be stored in job information storing unit 161, an instruction input unit 102 for receiving input of an operation signal based on an operation on operation panel 15, an authentication unit 103 for performing user authentication based on a login operation received by instruction input unit 102, a printing processing unit 104 for causing printer 14 to execute printing processing for the print job in accordance with the execution operation received by instruction input unit 102, a job list display processing unit 105 for executing job list display processing in which the job list of a login user is displayed on operation panel 15, a proxy registration processing unit 106 for executing proxy registration processing in which a "proxy" is set for a print job for which printing processing has not been completed, and a reporting unit 107 for making a report to PC 400 associated with a job issuer or portable terminal 200 associated with a user set as the "proxy."

Job list display processing unit 105 performs processing of displaying the screens shown in FIGS. 6, 7, 10, and 11. More specifically, job list display processing unit 105 performs processing for extracting job information associated with the login user from job information stored in job information storing unit 161 and displaying the job list showing print jobs indicated by the job information on operation panel 15. The "associated" job information includes a print job whose job issuer is a login user and information associated with that job, as well as a print job for which the login user has been set as the "proxy" and information associated with that job. Then, job list display processing unit 105 also extracts the job information for which the login user has been set as the "proxy", together with the job information whose job issuer is the login user.

If the "proxy mode" is selected on the screen of FIG. 7, proxy registration processing unit 106 performs processing of displaying the screen of FIG. 8 and setting a "proxy" for the indicated job. Proxy registration processing unit 106 executes processing of extracting users to be candidates in order to display the screen of FIG. 8 and present users to be candidates for the "proxy."

A user to be a candidate for the "proxy" corresponds to, as an example, a user who is in a room where MFP 100 is installed or a room where the job issuer is present, or a user allowed to enter/leave the rooms. A security door (a door at which authentication is required for entering/leaving a room and entering/leaving information is managed collectively in a security server) shall be provided for a room for proxy registration processing unit 106, and proxy registration processing unit 106 shall be connected to the above-mentioned security server not shown so as to be capable of obtaining security information. In this case, proxy registration processing unit 106 can obtain security information from the above-mentioned security server and extract a user who is in the room where MFP 100 is installed or the room where the job issuer is present, or a user allowed to enter/leave the rooms, as a candidate for the "proxy." The job issuer can thereby select preferentially the user who is in the room where MFP 100 is installed or the room where the job issuer is present, or the user allowed to enter/leave the rooms.

As another example, a user to be a candidate for the "proxy" may be a user having been indicated before by the job issuer. Proxy registration processing unit 106 may store a history of users set as the "proxy" when in the proxy mode, for each job issuer. Then, proxy registration processing unit 106 may extract and present the users having been indicated as the "proxy" before as candidates for the "proxy" based on that history for the job issuer. The job issuer can thereby easily make a selection from the history when indicating again a user having been indicated before.

As still another example, a user to be a candidate for the "proxy" may be a user directly indicated by the job issuer. Proxy registration processing unit 106 may receive direct input on operation panel 15 and set the input user as the "proxy." As an example, proxy registration processing unit 106 may receive a user name, an e-mail address, and the like. It will be easier to directly indicate a user by input than making a selection, such as when the job issuer has checked a user who is present in a room before the job issuer leaves the room.

Furthermore, proxy registration processing unit 106 may combine these methods. For example, a user corresponding to the above-mentioned user to be a candidate for the "proxy" may be extracted and presented by priority to other users, or may be presented in a different manner from the other users, such as by adding a mark thereto. The job issuer can thereby quickly determine as to which user is to be indicated as the "proxy", and setting becomes easier.

Reporting unit 107 has a report destination, such as an e-mail address, previously stored therein for each user. Once the "proxy" is set, reporting unit 107 reports that fact, such as by sending an e-mail message previously stored for reporting that fact to the e-mail address of the user set as the proxy.

Proxy registration processing unit 106 may create a message addressed to the proxy. The created message is sent from reporting unit 107 to the user set as the "proxy" together with the above-described report.

As an example, proxy registration processing unit 106 displays a screen as shown in FIG. 9. If "input on panel" is selected, proxy registration processing unit 106 stores text input by the user as a message in association with a print job.

Information that enables the user set as the "proxy" to perform appropriate processing, such as (1) which job, (2) when, (3) whom, (4) where, (5) how, (6) why, and the like, corresponds to the message. Alternatively, if "input on panel" is selected on the screen of FIG. 9, proxy registration processing unit 106 may present an input screen in a wizard format such that these pieces of information are entered as a message.

Moreover, proxy registration processing unit 106 may automatically specify the item (1) which job, for example, among the above-mentioned items based on the print job.

Furthermore, proxy registration processing unit 106 may automatically acquire job identification information obtained from the print job, information that specifies the current status of MFP 100 obtained from sensor 18 or the like, information that specifies the state of progress of printing processing, information on a print job for which a sheet is currently discharged to the paper discharge tray, image information included in the print job, and the like, and may automatically create a message including these pieces of information. Alternatively, proxy registration processing unit 106 may add these pieces of information to the message entered by the user. This enables the user set as the "proxy" to perform appropriate processing.

Printing processing unit 104 performs printing processing for the print job stored in job information storing unit 161 in accordance with an instruction from a user successfully authenticated by authentication unit 103. If the authenticated user is the user set as the "proxy" and printing processing unit 104 has printed a print job in the "proxy mode", reporting unit 107 makes a report by sending an e-mail message indicating the fact to portable terminal 200 which is the job issuer of that print job.

Reporting to the "proxy" by reporting unit 107 may be performed further at predetermined timing after setting of the "proxy", as well as at the setting of the "proxy." For example, reporting unit 107 may make a report to the user set as the "proxy" if the print job for which the "proxy mode" has been set is not executed for a prescribed time after setting of the mode. Alternatively, reporting unit 107 may make a report to the "proxy" at predetermined intervals after setting of the "proxy." This prompts secure processing by the "proxy."

<Flow of Operation>

Figure 13:
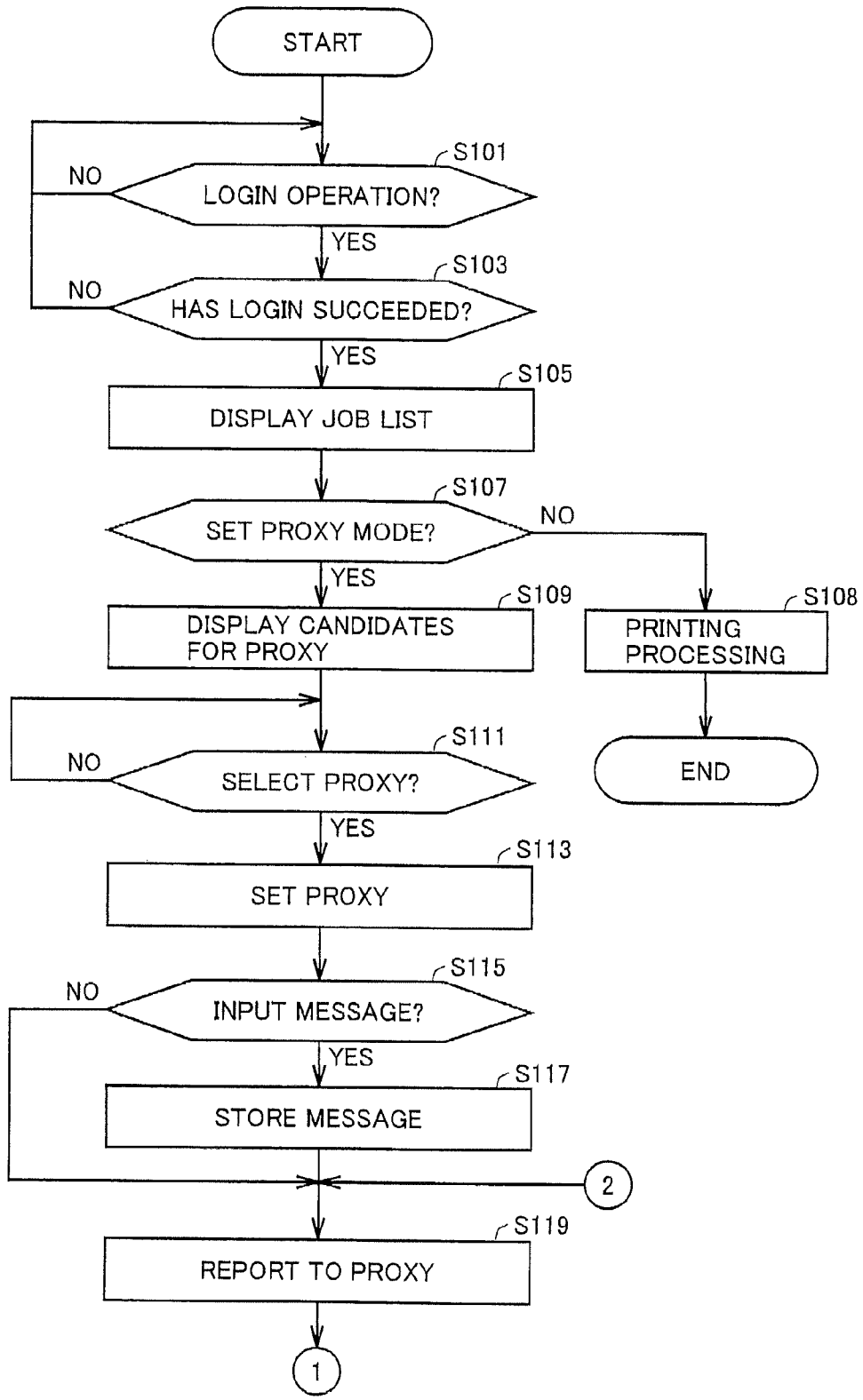
FIGS. 13 and 14 show a flow chart of a flow of operations in MFP.
Figure 14:
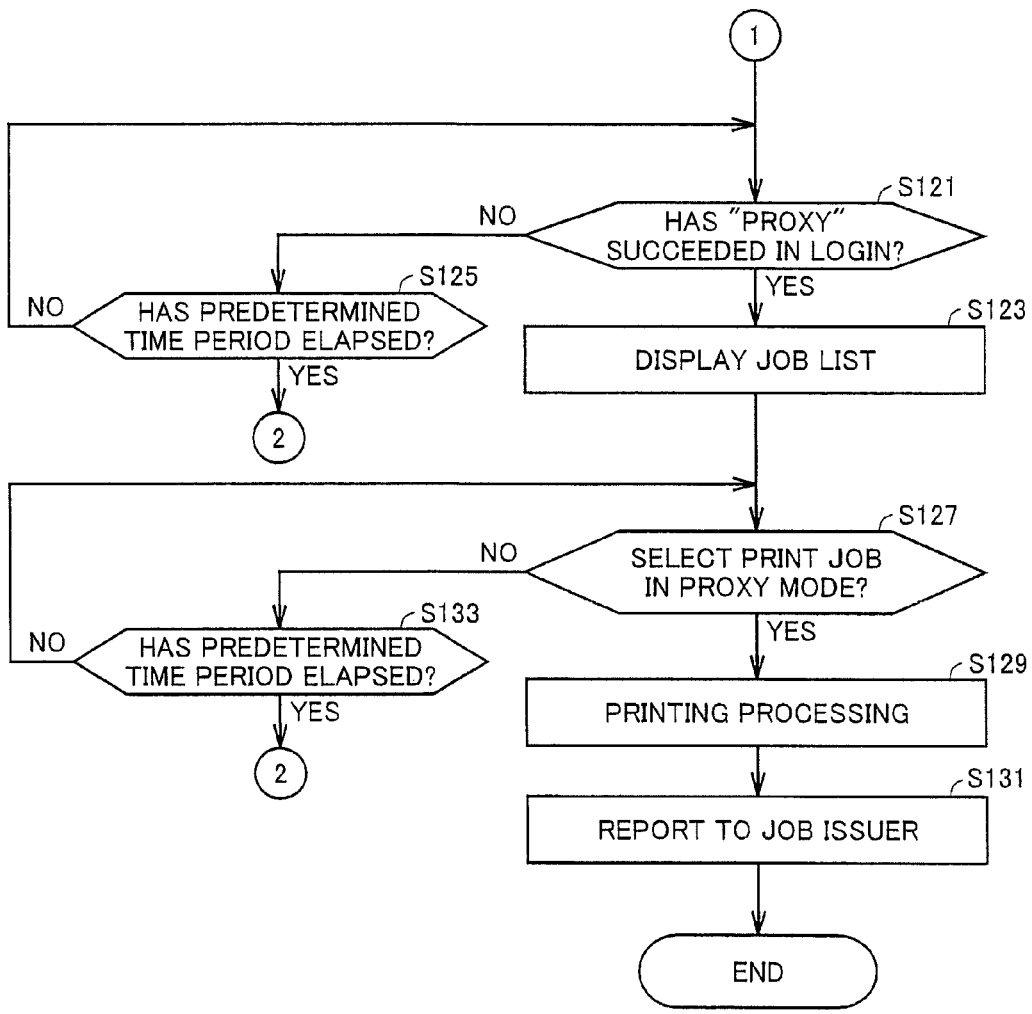

FIGS. 13 and 14 show a flow chart of operations in MFP 100. The operations shown in the flow chart of FIG. 13 are implemented by CPU 10 of MFP 100 reading and executing a program stored in ROM 11 and causing the respective functions of FIG. 12 to be exerted.

Referring to FIG. 13, if a login operation is received (YES in step S101) and the login has succeeded (YES in step S103), CPU 10 in step S105 causes the job list of print jobs associated with the login user of FIG. 6 to be displayed on operation panel 15.

If a job for which printing processing has not been completed is selected on that screen and the proxy mode is set for that print job (YES in step S107), CPU 10 in step S109 causes the screen of FIG. 8 presenting users to be candidates for the "proxy" to be displayed. Alternatively, CPU 10 may cause a screen having an entry field for direct entry of a user to be the "proxy" to be displayed.

If a user to be the "proxy" is selected on the screen (YES in step S111), CPU 10 in step S113 stores the selected user as the "proxy" in association with that print job. If input of a message is received on the screen of FIG. 9 (YES in step S115), CPU 10 in step S117 stores the input contents as a message in association with that print job. Alternatively, CPU 10 may create a message based on the print job and store the message in association with that print job.

In step S119, CPU 10 makes a report to the user having been set as the "proxy", and if a message associated with that print job has been stored in step S117, sends the message together to portable terminal 200 associated with that user.

If the proxy mode is not set by the login user but the normal mode is selected (NO in step S107), CPU 10 in step S108 performs normal printing processing for that print job, and terminates a series of operations.

Next, referring to FIG. 14, if the user having been set as the "proxy" in step S113 described above has succeeded in login (YES in step S121), CPU 10 in step S123 causes the job list of print jobs associated with that login user to be displayed on operation panel 15. This operation is similar to the operation in step S105 described above. Preferably, CPU 10 causes a print job for which the login user has been set as the "proxy" to be displayed in a different manner from the other print jobs (print jobs whose job issuer is the login user), as shown in FIG. 10. This allows the login user to understand at a glance that there is a print job for which he/she has been requested to process.

If the user set as the "proxy" does not log in or succeed in login until a prescribed time has elapsed after setting of the "proxy" (NO in step S121 and YES in step S125), CPU 10 returns the operation to step S119 described above, and makes a report again to the user having been set as the "proxy."

If processing for the print job for which the "proxy" has been set is selected from the job list displayed in step S123 described above (YES in step S127), CPU 10 in step S129 executes printing processing for that print job. On this occasion, CPU 10 may reproduce (e.g., provide display or audio output of) a message at the time when processing for the above-described print job is selected, in place of or in addition to transmission of the message to portable terminal 200 in step S119 described above.

When the printing processing for the above-described print job has been completed, CPU 10 in step S131 sends an e-mail message indicating that printing has been completed to PC 400 associated with the job issuer, thereby reporting that printing has been completed. Then, a series of operations are terminated.

Also if processing for the above-described print job for which the "proxy" has been set is not performed until a prescribed time has elapsed after setting of the "proxy" (NO in step S133), CPU 10 returns the operation to step S119 described above, and makes a report again to the user having been set as the "proxy."

Effects of Embodiment

With the above-described operations performed in MFP 100, if printing processing is delayed by print job waiting or a machine trouble after the job issuer has issued a print job, the job issuer can request another user to receive the printed matter. On that occasion, MFP 100 registers the other user in association with that print job, and outputs the printed matter on condition that the other user succeeds in login.

The job issuer can thereby request the other user to receive the printed matter while maintaining his/her own schedule after the issuance of the print job, and can also maintain security of the printed matter.

Another Example 1

The above description has been directed to an example where MFP 100 operates alone. As another example, server 300 as a management device shown in FIG. 1 may perform the above-described operation.

Another Example 2

In the above example, the job issuer shall log in to MFP 100 to set a user to be the "proxy." As another example, the job issuer may log in to MFP 100 using PC 400 or portable terminal 200 so that a user to be the "proxy" can be set using a device other than MFP 100. More specifically, when the job issuer logs in to MFP 100 using PC 400 or portable terminal 200, a job list for that user as shown in FIG. 6 may be displayed on PC 400 or portable terminal 200, so that the job issuer can set the "proxy mode" on that screen to thereby indicate the "proxy."

Then, when printing a material for a meeting, for example, and if printing is uncompleted at the start time of the meeting, the job issuer will be able to go first to a meeting room and request another user to receive a printed matter remotely from the meeting room. This remote operation may be made possible by starting a printer driver installed in PC 400 or portable terminal 200, for example.

Another Example 3

A plurality of users may be set as "proxies." Then, a report may be made to all of the plurality of users having been set, so that printing processing may be performed when any of the users logs in to MFP 100. Alternatively, printing processing may be performed only with an instruction from a user among the plurality of users who has first succeeded in login to MFP 100. That is, when printing processing is executed by the first user, CPU 10 may cancel the setting of the proxy mode for that print job and may delete information on the users set as the "proxies" stored in association with that print job.

This allows a printed matter to be obtained quickly and can avoid redundant printing processing.

Another Example 4

A program for causing MFP 100 or server 300 to execute the above-described operations may be provided. Such a program can be recorded on a computer-readable recording medium, such as a flexible disk attached to a computer, a CD-ROM (Compact Disk-Read Only Memory), a ROM, a RAM, a memory card, or the like, and can be offered as a program product. Alternatively, the program can be offered as recorded on a recording medium such as a hard disk built in a computer. Still alternatively, the program can also be offered by downloading through a network.

The program according to the present invention may cause the process to be executed by invoking a necessary module among program modules offered as part of an operating system (OS) of a computer with a predetermined timing in a predetermined sequence. In that case, the program itself does not include the above-described module, but the process is executed in cooperation with the OS. Such a program not including a module may also be covered by the program according to the present invention.

Moreover, the program according to the present invention may be offered as incorporated into part of another program. Also in such a case, the program itself does not include the module included in the above-described other program, and the process is executed in cooperation with the other program. Such a program incorporated into another program may also be covered by the program according to the present invention.

An offered program product is installed in a program storage unit, such as a hard disk, and is executed. It is noted that the program product includes a program itself and a recording medium on which the program is recorded.

Although the present invention has been described and illustrated in detail, it is clearly understood that the same is by way of illustration and example only and is not to be taken by way of limitation, the scope of the present invention being interpreted by the terms of the appended claims.

What is claimed is:

1. A printing device comprising:
an authentication unit;
a first input unit configured to receive input of a print job;
a printing unit configured to perform printing processing for the print job;
a second input unit configured to receive input of an instruction on output of a printed matter of said print job; and
a controller configured to control the printing processing in said printing unit in accordance with an instruction from a user successfully authenticated by said authentication unit,
said controller including a setting unit configured to be capable of setting, for said print job, a user different from an issuer of said print job as a user who instructs output of said printed matter, and
said controller being configured to cause said printed matter to be output when said instruction on output is made by the user set as the user who instructs output of said printed matter.

2. The printing device according to claim 1, further comprising a communication unit configured to communicate with another device, wherein
said setting unit is configured to set the user who instructs output of said printed matter in accordance with an operation signal input from the other device.

3. The printing device according to claim 1, wherein said setting unit is configured to:
present, for said print job, candidates for the user who instructs output of said printed matter; and
set a user selected from among said candidates as the user who instructs output of said printed matter.

4. The printing device according to claim 3, wherein said setting unit is configured to be capable of communicating with a management device configured to manage user's entering/leaving a room, and present one of a user who is in a room where said printing device is installed and a user allowed to enter/leave said room, as a candidate for the user who instructs output of said printed matter.

5. The printing device according to claim 3, wherein said setting unit is configured to store, for each issuer of a print job, a history of users set as the user who instructs output of said printed matter for a print job issued by the issuer, and present candidates for the user who instructs output of said printed matter based on said history of the issuer of said print job.

6. The printing device according to claim 1, further comprising a communication unit configured to communicate with another device, wherein
said controller further includes a reporting unit configured to make a report to a destination associated with a user set as the user who instructs output of said printed matter.

7. The printing device according to claim 6, wherein said reporting unit is configured to make a report on identification information on said print job.

8. The printing device according to claim 6, wherein said reporting unit is configured to make a report on at least one of a status of said printing device and a state of progress of printing processing for said print job.

9. The printing device according to claim 6, wherein when there is no instruction on output of said printed matter made by the user set as the user who instructs output of said printed matter within a prescribed time period, said reporting unit is configured to make a report to said destination associated with the user set as the user who instructs output of said printed matter.

10. The printing device according to claim 1, wherein when said setting unit sets a plurality of users as the user who instructs output of said printed matter, after output of said printed matter is instructed by one user among said plurality of users and said printed matter is output, said controller is configured to cancel setting as the user who instructs output of said printed matter made on users other than said one user among said plurality of users.

11. A management device for managing printing processing for a print job in a printing device, comprising:
   a first input unit configured to receive input of a print job;
   a second input unit configured to receive input of an instruction on output of a printed matter of said print job; and
   a processing unit configured to instruct said printing device on printing processing for said print job in accordance with an instruction from a user successfully authenticated,
   said processing unit including a setting unit configured to be capable of setting a user different from an issuer of said print job, as a user who instructs output of said printed matter, and
   said processing unit is configured to cause said printing device to output said printed matter when said instruction on output is made by the user set as the user who instructs output of said printed matter.

12. A method for managing printing processing for a print job in a printing device, comprising:
   inputting a print job to said printing device;
   setting a user different from an issuer of said print job as a user who instructs output of a printed matter of said print job before the printed matter of said print job is output from said printing device; and
   outputting said printed matter in said printing device when said instruction on output is received from the user set as the user who instructs output of said printed matter.

13. A non-transitory computer-readable storage medium having stored therein a program for causing a computer to execute management of printing processing for a print job in a printing device,
   said program causing a controller of said computer to execute:
   inputting a print job to said printing device;
   setting a user different from an issuer of said print job as a user who instructs output of a printed matter of said print job before the printed matter of said print job is output from said printing device; and
   causing said printing device to output said printed matter when said instruction on output is received from the user set as the user who instructs output of said printed matter.

* * * * *